United States Patent [19]

Johnson

[11] Patent Number: 5,129,067

[45] Date of Patent: Jul. 7, 1992

[54] MULTIPLE INSTRUCTION DECODER FOR MINIMIZING REGISTER PORT REQUIREMENTS

[75] Inventor: William M. Johnson, San Jose, Calif.

[73] Assignee: Advanced Micro Devices, Inc., Austin, Tex.

[21] Appl. No.: 361,914

[22] Filed: Jun. 6, 1989

[51] Int. Cl.[5] ............... G06F 9/30; G06F 9/34; G06F 9/38; G06F 12/02

[52] U.S. Cl. ............... 395/375; 364/238.6; 364/239.8; 364/240.5; 364/262.4; 364/262.8; 364/262.9; 364/231.8; 364/247.4; 364/247.6; 364/242.6; 364/241.9; 364/DIG. 1; 395/725

[58] Field of Search ... 364/200 MS File, 900 MS File

[56] References Cited

U.S. PATENT DOCUMENTS

| | | | |
|---|---|---|---|
| 4,443,848 | 4/1984 | Gehman | 364/200 |
| 4,473,880 | 9/1984 | Budde et al. | 364/200 |
| 4,488,217 | 12/1984 | Binder et al. | 364/200 |
| 4,604,683 | 8/1986 | Russ et al. | 364/200 |
| 4,764,866 | 8/1988 | Downey | 364/200 |

Primary Examiner—Thomas C. Lee
Assistant Examiner—Daniel Pan
Attorney, Agent, or Firm—Foley & Lardner

[57] ABSTRACT

A multiple instruction decoder includes an input latch for receiving a plurality of logic instructions, wherein the plurality of logic instructions include N register-operand identifiers; arbitration logic coupled to the input latch for arbitrating read port contentions by the N register-operand identifiers for M available read ports (where M is less than N) based on arbitration data corresponding to each of the logic instructions, and for generating control signals indicative thereof; and a multiplexing unit for selectively supplying the N register-operand identifiers to the M available read ports in response to the control signals generated by the arbitration logic.

7 Claims, 7 Drawing Sheets

| C FIELD | TAG CODE | A FIELD | TAG CODE | B FIELD | TAG CODE |
|---|---|---|---|---|---|
| NORMAL | 00 | NO OP | 000 | NO OP | 000 |
| STACK OP | 01 | RD DEST 0 | 001 | RD DEST 0 | 001 |
| SERIALIZATION | 10 | RD DEST 1 | 010 | RD DEST 1 | 010 |
| DOUBLE | | RD DEST 2 | 011 | RD DEST 2 | 011 |
| PRECISCION | 11 | RD | 100 | RD | 100 |
| | | CONSTANT | 101 | CONSTANT | 101 |
| | | RD DOUBLE WORD | 110 | RD DOUBLE WORD | 110 |

MULTIPLE INSTRUCTION DECODER FOR MINIMIZING REGISTER PORT REQUIREMENTS

BACKGROUND OF THE INVENTION

The present invention relates to a decoder for use in a processing system. In particular, the present invention provides a low cost four-instruction decoder for a super-scalar processor.

The time taken by a computing system to perform a particular application is determined by three basic factors, namely, the processor cycle time, the number of processor instructions required to perform the application, and the average number of processor cycles required to execute an instruction. Overall system performance can be improved by reducing one or more of these factors. For example, the average number of cycles required to perform an application can be significantly reduced by employing a multi-processor architecture, i.e., providing more than one processor to execute separate instructions concurrently.

There are disadvantages, however, associated with the implementation of a multi-processor architecture. In order to be effective, multi-processing requires an application that can be easily segmented into independent tasks to be performed concurrently by the different processors. The requirement for a readily segmented task limits the effective applicability of multi-processing. Further, the increase in processing performance attained via multi-processing in many circumstances may not offset the additional expense incurred by requiring multiple processors.

Single-processor hardware architectures that avoid the disadvantages associated with multi-processing have been proposed. These so called "super-scalar" processors permit a sustained execution rate of more than one instruction per processor cycle, as opposed to conventional scalar processors which—while capable of handling multiple instructions in different pipeline stages in one cycle—are limited to a maximum pipeline capacity of one instruction per cycle. In contrast, a super-scalar pipeline architecture achieves concurrency between instructions both in different pipeline stages and within the same pipeline stage.

A super-scalar processor that executes more than one instruction per cycle, however, can only be effective when instructions can be supplied at a sufficient rate. It is readily apparent that instruction fetching can be a limiting factor in overall system performance if the average rate of instruction fetching is less than the average rate of instruction execution. Although the amount of instruction-level concurrency in most applications is sufficient to support an execution rate of two instructions per cycle, it is difficult to provide the required instruction bandwidth. For example, branches disrupt the sequentiality of instruction addressing, causing instructions to be misaligned with respect to an instruction decoder. This in turn causes some otherwise valid fetch and decode cycles to be only partially effective in supplying the processor with instructions, because the entire width of the instruction fetcher is not occupied by valid instructions.

The sequentially-fetched instructions between branches is called a run, and the number of instructions fetched sequentially is called the run length. FIG. 1 illustrates two instruction runs consisting of a number of instructions occupying four instruction-cache blocks (assuming a four-word cache block) in an instruction cache memory. The first instruction run consists of instructions S1-S5 that contain a branch to a second instruction run T1-T4. FIG. 2 illustrates how these instruction runs are sequenced through a four-instruction decoder and a two-instruction decoder, assuming for purposes of illustration that two cycles are required to determine the outcome of a branch.

FIG. 3 demonstrates the benefit of a four-instruction decoder measured during the execution of selected sample applications. For these programs, the average fetch efficiency is 1.72 instructions per cycle for a two-instruction decoder and 2.75 instructions per cycle for a four-instruction decoder. As would be expected, the four-instruction decoder always out-performs a two-instruction decoder, as the four-instruction decoder has twice the potential instruction bandwidth of the two-instruction decoder.

In actual implementation, however, directly modeling a four-instruction decoder after a single-instruction decoder is not cost-effective. In a straightforward implementation, decoding four instructions per cycle would require eight read ports on both the processor's register file and result buffer, and eight buses for distributing operands. Other problems include the requirement for a tremendous number of comparators in the processor execution hardware for dependency analysis. Thus, the increased hardware requirements of a four-instruction decoder generally outweigh the performance benefits gained by its implementation.

SUMMARY OF THE INVENTION

In view of the above, the present invention is directed toward providing a four-instruction decoder architecture that can be easily and economically implemented. The present invention is based on the recognition that most of the capability of a conventionally implemented four-instruction decoder is not utilized. Thus, arbitration logic can be employed within the four-instruction decoder to reduce contention for register read ports.

More specifically, in a preferred embodiment of the invention, a four-instruction decoder is provided that includes: an input latch for receiving a plurality of logic instructions, wherein the plurality of logic instructions include N register-operand identifiers; arbitration logic coupled to the input latch for arbitrating read port contentions by the N register-operand identifiers for M available read ports (where M is less than N) based on arbitration data corresponding to each of the logic instructions, and for generating control signals indicative thereof; and a multiplexing unit for selectively supplying the N register-operand identifiers to the M available read ports in response to the control signals generated by the arbitration logic.

BRIEF DESCRIPTION OF THE DRAWINGS

With the above as background, reference should now be made to the following detailed description of the preferred embodiments in conjunction with the drawings, in which.

DETAILED DESCRIPTION OF THE PREFERRED EMBODIMENTS

Figure 1:
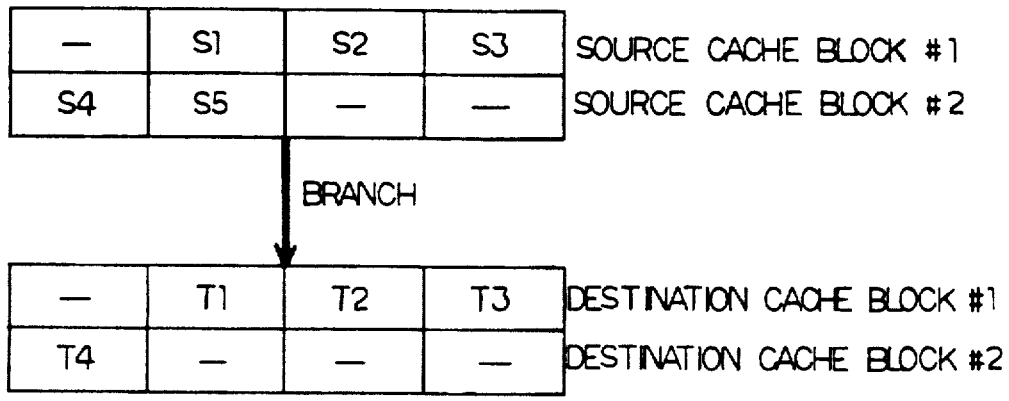
FIG. 1 shows a sequence of two instruction runs to illustrate decoder behavior.
Figure 2:
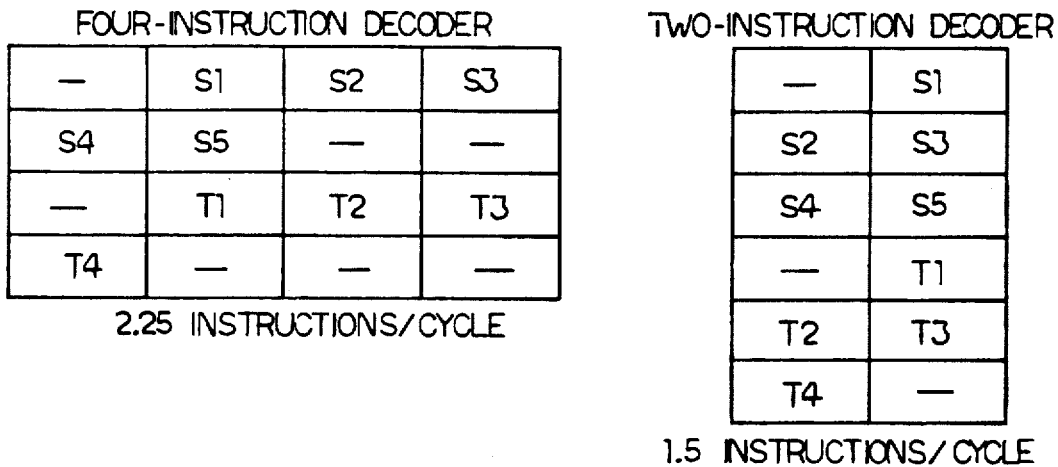
FIG. 2 illustrates the sequencing of the instruction runs shown in FIG. 1 through a two-instruction and four-instruction decoder.
Figure 3:
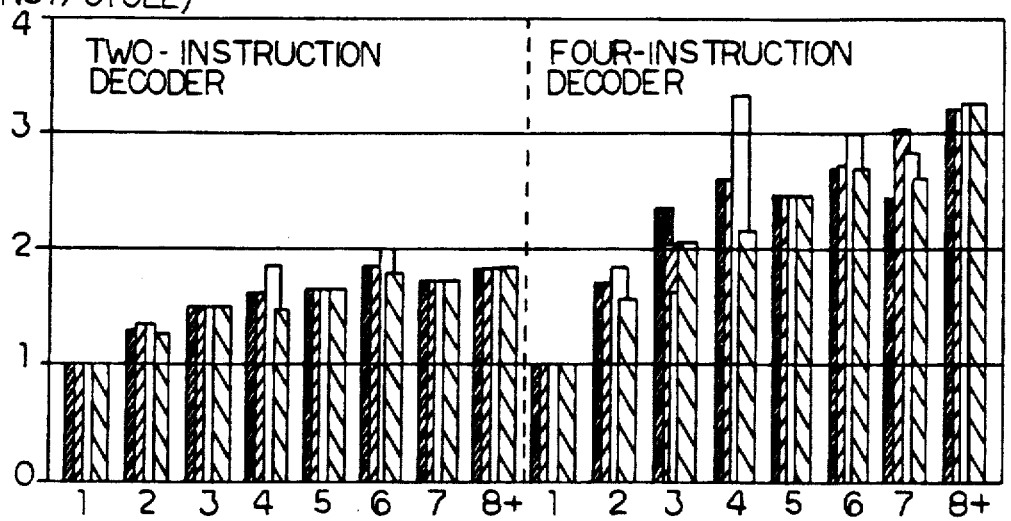
FIG. 3 illustrates the benefit of a four-instruction decoder measured during the execution of selected sample applications.
Figure 4:
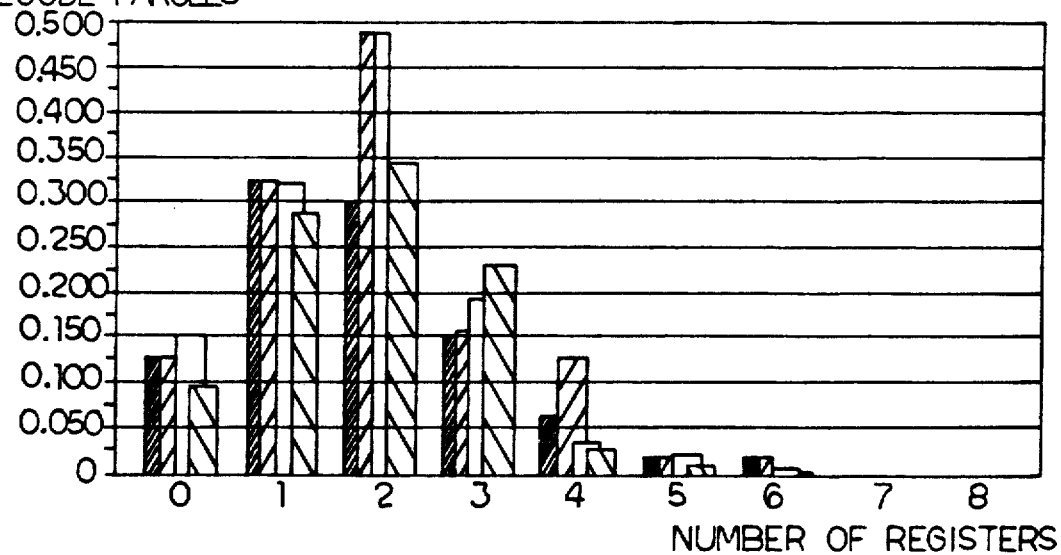
FIG. 4 illustrates the demand on register-file operands by a four-instruction decoder during the execution of selected sample applications.

As mentioned above, the present invention is based on the recognition that most of the capabilities of a conventionally implemented (i.e. modeled after a one-instruction decoder) four-instruction decoder would not be utilized. For example, FIG. 4 illustrates the demand on register-file operands by a four-instruction decoder during the execution of selected sample applications. The distribution illustrated in FIG. 4 was measured with the decoder occupied by valid instructions on every cycle (there were no branch delay cycles, although there were alignment penalties) and therefore represents an upper bound. There are several reasons why the register demand is so low: not all decoded instructions access two registers, not all decoded instructions are valid (due to misalignments), and some decoded instructions have dependencies on one or more simultaneously-decoded instruction (the associated operands are obtained later by result forwarding).

Figure 5:
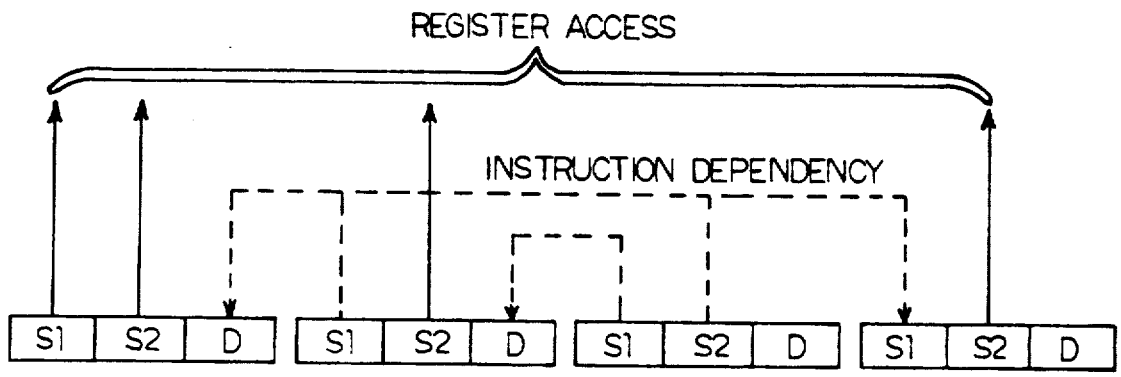
FIG. 5 illustrates dependency information for an instruction to be supplied to a four-instruction decoder in abstract form.

It is possible to take advantage of the low register demand by including arbitration logic within the decoder to arbitrate among the instructions for register ports. Preferably, pre-decoding logic is also employed between the processor's instruction memory and its instruction cache to add dependency information which is used for arbitration to a simultaneously decoded instruction group. The dependency information, however, could compose part of the normal instruction format. The dependency information indicates which instructions in the group are dependent on values computed by other instructions in the group, and is used by the arbitration logic to assign the register ports. FIG. 5 illustrates the dependency information in abstract form (S1 and S2 denote source-operand fields, while D denotes a destination field). Only dependencies for register-based operands are important, as the primary goal is to allow the hardware to reduce contention for register read ports.

Figure 7:
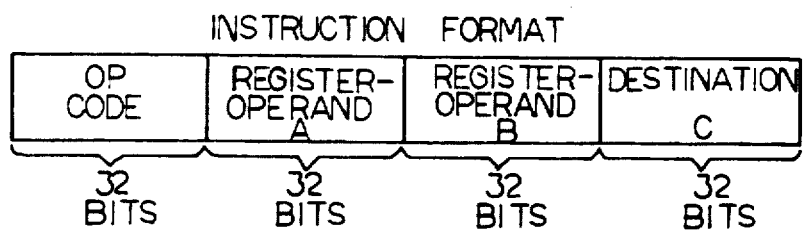
FIG. 7 is a representation of an instruction format for an instruction to be supplied to the processor illustrated in FIG. 6.
Figure 6:
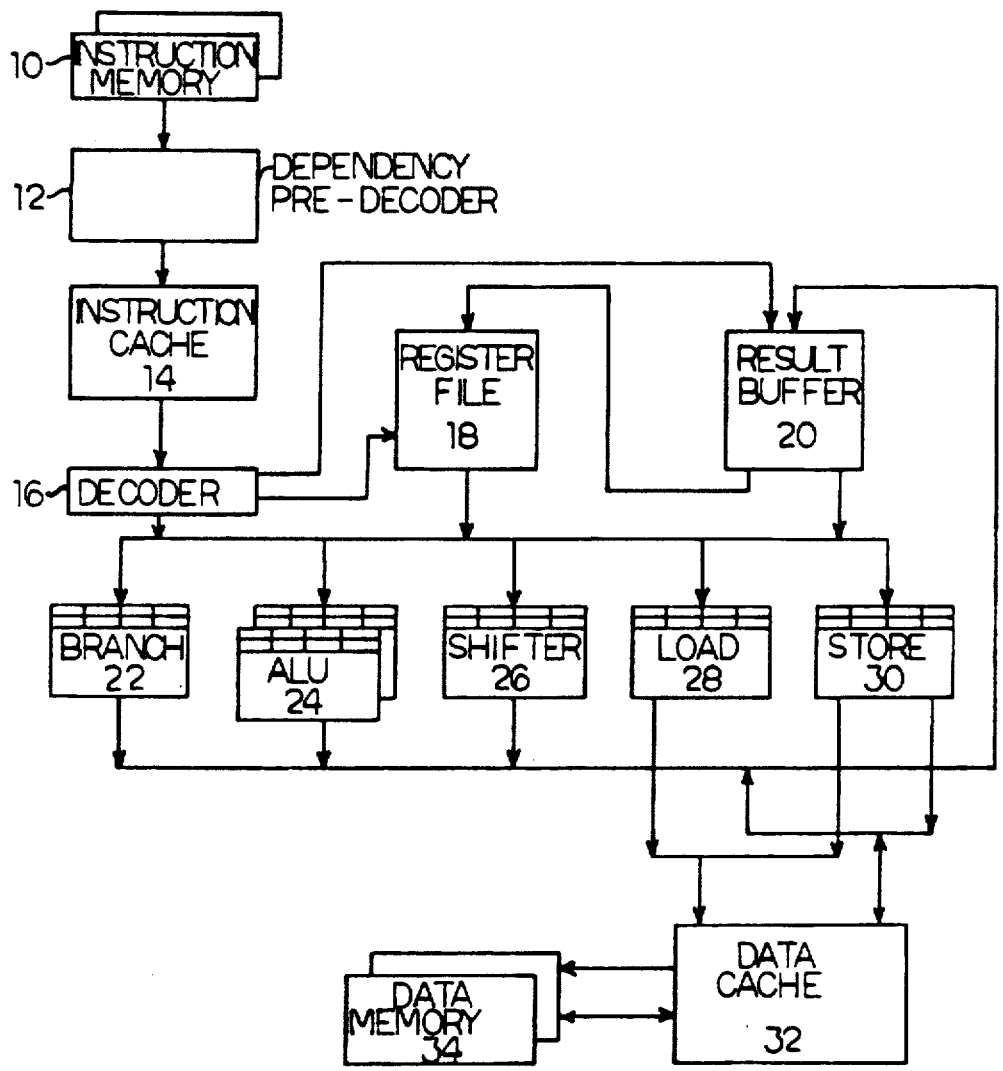
FIG. 6 is a block diagram of a processor incorporating the present invention.

FIG. 6 illustrates a block diagram of a super-scalar processor in accordance with the present invention that includes an instruction memory 10, a dependency predecoder 12, an instruction cache 14, a four-instruction decoder 16, a register file 18, a result buffer 20, a branch execution unit 22, an arithmetic logic unit (ALU) 24, a shifter unit 26, a load unit 28, a store unit 30, a data cache 32, and a data memory 34. For purposes of illustrating the invention, it will be assumed that the super-scalar processor illustrated in FIG. 6 is a 32-bit machine, wherein each instruction consists of 128-bits as illustrated in FIG. 7. For example, the A and B fields represent register-operand fields for an ADD instruction, wherein the A operand is added to the B operand and the result is placed into the destination location designated by the C field.

Figures 8A, 8B:
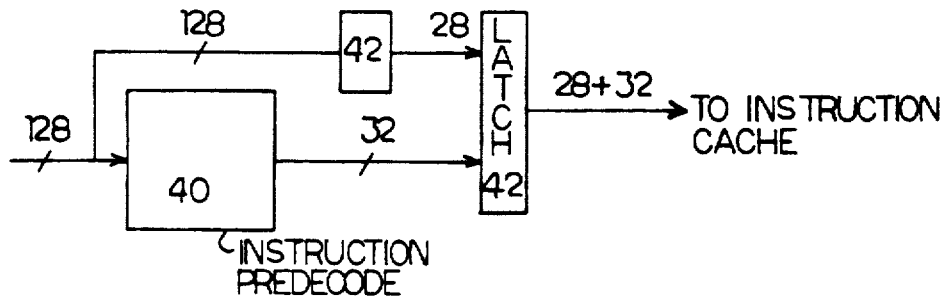
FIG. 8A is a block diagram of a dependency pre-decoder employed in the processor illustrated in FIG. 6.
FIG. 8B is a representation of arbitration data added to an instruction block by the dependency pre-decoder illustrated in FIG. 8A.

The dependency pre-decoder 12, as illustrated in greater detail in FIG. 8A, includes an instruction predecoder unit 40, which in a preferred embodiment is a programmed logic array (PLA), a delay latch 42, and an output latch 44. In operation, a four instruction block is loaded from the instruction memory 10 into both the instruction predecoder 40 and the delay latch 42. The instruction decoder 40 generates an 8-bit predecoded tag for each of the instructions in the instruction block, which is indicative of the type of operation being performed by the instruction and its register port requirements. As there are four instructions contained within each instruction block, the output of the instruction predecoder 40 consists of 32 bits of predecoded arbitration information which is combined with the four instructions contained in the instruction block prior to storage in the instruction cache 14.

FIG. 8B illustrates the format of the 8-bit predecode tag for each instruction. The 8-bit tag is composed of 2-bits corresponding to the C field of an instruction, 3-bits corresponding to the A field of an instruction, and 3-bits corresponding to the B field on an instruction, which are used to define the port access requirements for the instruction.

Figure 9:
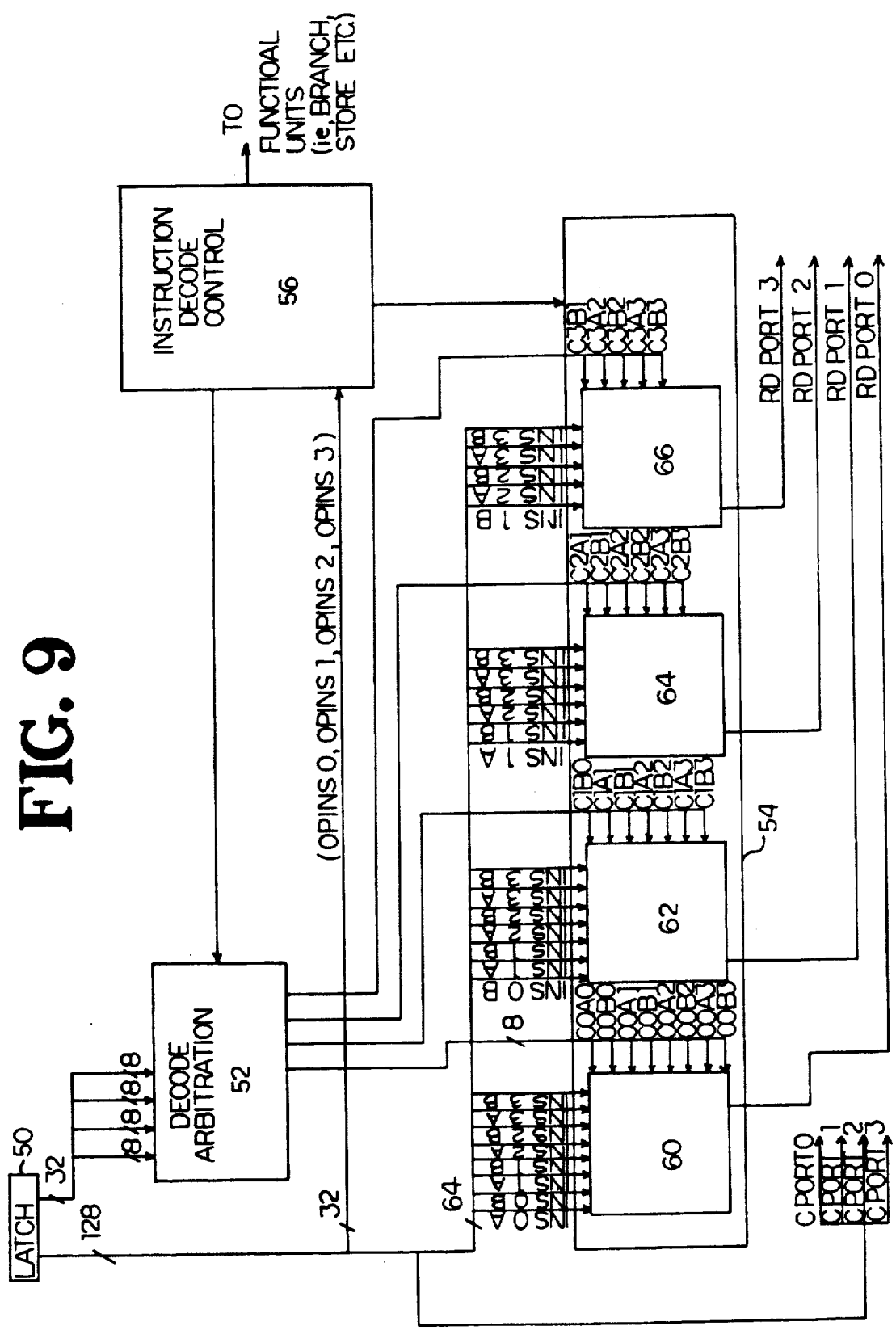
FIG. 9 is a block diagram of a four instruction decoder employed in the processor illustrated in FIG. 6.

As illustrated in FIG. 9, the four-instruction decoder 16 includes an input latch 50, an instruction decode arbitration unit 52, a multiplexing unit 54 and an instruction decode control unit 56. The instruction decode arbitration unit 52 is coupled to the input latch 50 to receive the 32-bits of predecode arbitration data corresponding to an instruction block that is loaded into the input latch 50. The instruction decode control unit 56 is configured to directly receive the opcode fields from the four instructions (OPINS0, OPINS1, OPINS2 and OPINS3) contained within an instruction block. The multiplexing unit 56 is configured to receive the A and B operands of the four instructions (INS0A, INS0B, INS1A, INS1B, INS2A, INS2B, INS3A and INS3B). The destination fields, i.e., the C fields, of each instruction is provided directly to destination buses CPORT0, CPORT1, CPORT2 and CPORT3 which are coupled to the result buffer 20.

In operation, an instruction block is loaded from the instruction cache 14 into the input latch 50 of the four-instruction decoder 16. The decode arbitration unit 52 then begins allocation of four available read buses (RD0PORT, RD1PORT, RD2PORT and RD3PORT), which are coupled to the four read ports of the register file 18 and reorder buffer 20, to the register-operands corresponding to valid instructions. There are eight possible register-operands (INS0A, INS0B, INS1A, INS1B, INS2A, INS2B, INS3A, and INS3B) contained within the four instructions that may require access to the four available read ports. Preferably, the decode arbitration unit 52 allocates the four available read ports between the eight possible register-operands in the following manner: a required access is enabled on the first port if no other previous operand requires an access, on the second port if one previous operand requires an access, on the third port if two previous operands require ports, on the fourth port if three previous operands use ports, and on no port if four previous operands use ports (i.e. the decoder would stall).

In order to allocate the read ports, the decode arbitration unit 52 generates multiplexer control signals which are supplied to the multiplexing unit 54, so that the register-operand for a given instruction can be selectively provided to one of the four available read buses RDPORT0, RDPORT1, RDPORT2 and RDPORT3. As illustrated in FIG. 9, the multiplexing unit 54 includes four multiplexer circuits 60-66. The first multiplexing circuit 60 has as its inputs all of the possible register-operands and the eight control signals (C0A0, C0B0, C0A1, C0B1, C0A2, C0B2, C0A3 and C0B3) generated by the arbitration unit 52, and as its output the RDPORT0 read bus. The second multiplexing unit 62, which has as its output the read bus RD1PORT, need not include the first register-operand INS0A as an input, as INS0A would only be supplied to the first read bus RDPORT0, and therefore only requires seven control signals (C1A0, C1B00, C1A1, C1B1, C1A2, C1A3 and C1B3).

In other words, based on the arbitration scheme discussed above, the first read bus RDPORT0 would be assigned to the register-operand INS0A if the register-operand required a port access, and would be assigned to subsequent register-operands if INS0A did not require a port access. In no case, however, would the INSOA register-operand be assigned to a read bus other than the first read bus RD0PORT. Similarly, the third multiplexing unit 64, which has as its output read bus RDPORT2, need not include the first and second register-operand INS0A and INS0B, and the fourth multiplexing unit 66, which has as its output RDPORT3, need not include the first, second and third register operands INS0A, INS0B, and INS1. Accordingly, the third an fourth multiplexing units 64 and 66 need only be supplied with six and five multiplexer control signals, respectively, from the decode arbitration unit 52.

Figure 10:
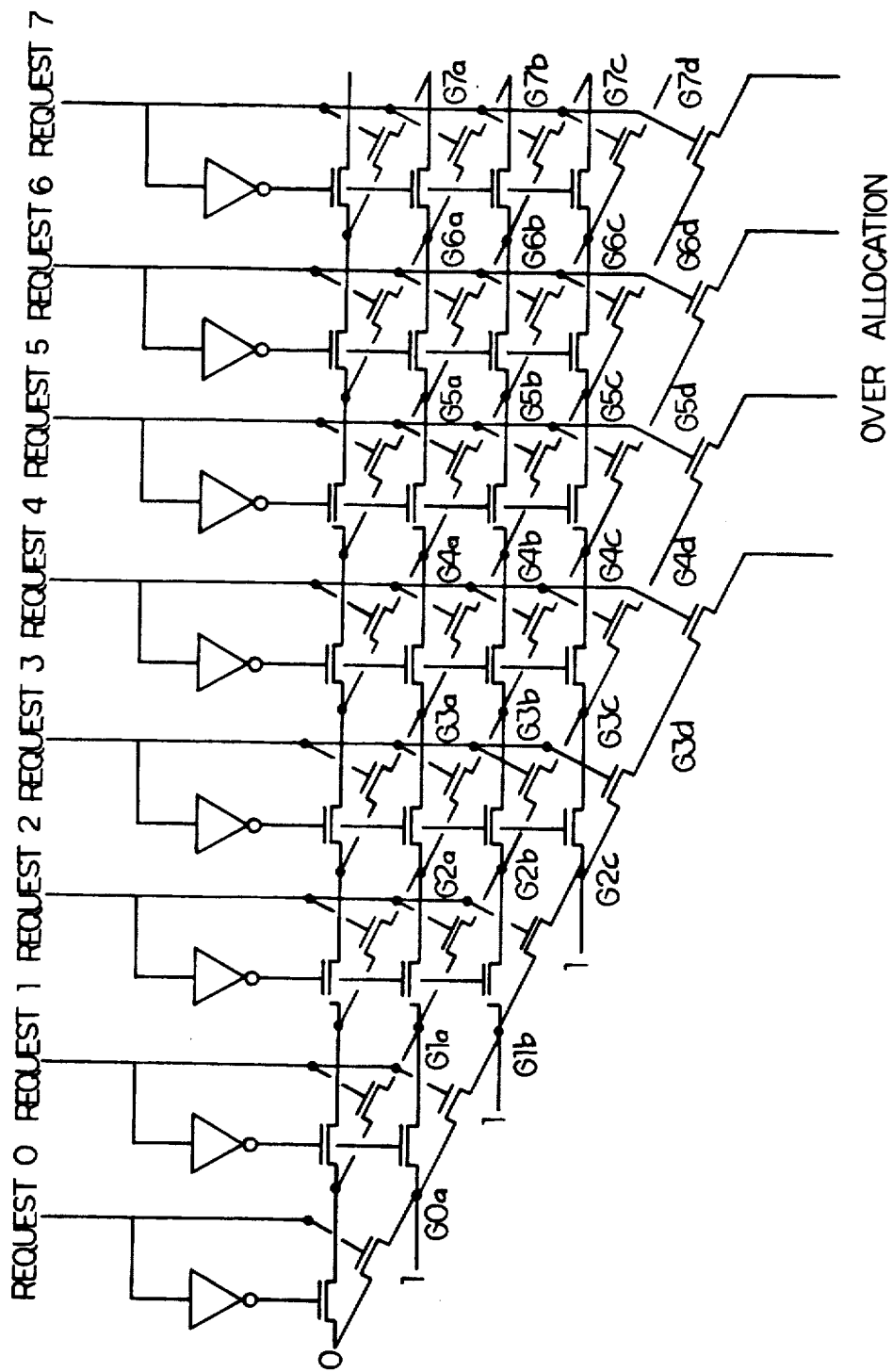
FIG. 10 is a schematic diagram of a circuit array that is employed in an arbitration decode unit of the four-instruction decoder illustrated in FIG. 9.

FIG. 10 illustrates an example of a circuit array that may be incorporated within the decode arbitration unit 52 to generate the multiplexer control signals. The circuit array includes eight request lines, each of which corresponds to a register-operand requiring a port access, that are connected to four control signal generation lines (G1-G4). In operation, a low logic level "0" is applied to the first generation line G1 and a high logic level "1" is applied to the remaining generation lines G2-G4. The multiplexer control signals are generated based on "passing" of the logic "0" from one generation line to the next. For example, the REQUEST 0 line is activated if the first register-operand (INSOA) requires a port access, which causes the second generation line to be driven to a logic "0". This passing event can be detected and used to generate the C0A0 multiplexer control signal which indicated the first read bus RDPORT0 should be assigned to the first register-operand INS0A.

The above-described four-instruction decoder architecture takes advantage of the fact that the capabilities of a four-instruction decoder would not be fully utilized if implemented in a conventional manner, i.e., by utilizing eight read ports, and employs port arbitration to enable the four-instruction decoder to function with only four available read ports. Thus, the hardware requirements are significantly reduced and the design simplified for a processor employing the disclosed four-instruction decoder architecture.

The invention has been described with particular reference to certain preferred embodiments thereof. Modifications and variations, however, may be made within the scope of the appended claims.

What is claimed is:

1. A multiple instruction decoder for minimizing register port requirements, comprising:
   a. input means for receiving a plurality of logic instructions, wherein said plurality of logic instructions include N, register-operand identifiers, where N is greater than zero, wherein said input means includes a predecoder for predecoding said logic instructions and generating arbitration data corresponding to each of said logic instructions and a cache memory, coupled to said predecoder, for receiving and storing said arbitration data;
   b. arbitration means coupled to said input means for arbitrating read port contentions by said N register-operand identifiers for M available read ports, where M is less than N and greater than zero, and generating control signals indicative thereof; and
   c. multiplexing means for selectively supplying said N register-operand identifiers to said M available read ports means in response to said control signals.

2. The multiple instruction decoder as recited in claim 1, wherein N is equal to 4 and M is equal to 2.

3. The multiple instruction decoder as recited in claim 1, wherein N is equal to 8 and M is equal to 4.

4. A multiple instruction decoder for minimizing register port requirements, comprising:
   a. storage means for storing a plurality of instruction blocks, each of said instruction blocks including a plurality of logic instructions;
   b. predecoding means, coupled to said storage means, for retrieving and predecoding said instruction blocks from said storage means, wherein said predecoding means generates arbitration data corresponding to each of said instruction blocks;
   c. cache storage means, coupled to said predecoding means, for receiving and storing said instruction blocks and their corresponding arbitration data;
   d. register means for storing data variables;
   e. execution means, coupled to said register means, for executing said logic instructions contained within said instruction blocks; and
   f. instruction decoding means for receiving said instruction blocks and their corresponding arbitration data from said cache storage means, for decoding the instructions contained within said instruction blocks, and for arbitrating access to said register means based on said arbitration data corresponding to said instruction blocks.

5. A multiple instruction decoder for minimizing register port requirements, comprising:
   a. storage means for storing a plurality of instruction blocks, wherein said instruction blocks include N, register-operands, where N is greater than zero, and arbitration data, wherein said storage means includes a predecoder for predecoding said logic instructions and generating said arbitration data corresponding to each of said instruction blocks and a cache memory, coupled to said predecoder, for receiving and storing said arbitration data;
   b. arbitration means, coupled to said storage means, for receiving said plurality of instruction blocks from said storage means and arbitrating read port contentions by said N register-operands for M available read buses, where M is greater than zero, which are coupled to M read ports of a storage device. based on said arbitration data; and c. multiplexing means coupled to said arbitration means for selectively supplying said N register operands to said M read buses in response to control signals generated by said arbitration means.

6. The multiple instruction decoder as recited in claim 5, wherein N is equal to 4 and M is equal to 2.

7. The multiple instruction decoder as recited in claim 5, wherein N is equal to 8 and M is equal to 4.

* * * * *